US005788722A

United States Patent [19]

Emert et al.

[11] Patent Number: 5,788,722
[45] Date of Patent: Aug. 4, 1998

[54] HIGH FUNCTIONALITY LOW MOLECULAR WEIGHT OIL SOLUBLE DISPERSANT ADDITIVES USEFUL IN OLEAGINOUS COMPOSITIONS

[75] Inventors: Jack Emert, Brooklyn, N.Y.; Robert Dean Lundberg, Bridgewater, N.J.

[73] Assignee: Exxon Chemical Patents Inc, Linden. N.J.

[21] Appl. No.: 453,839

[22] Filed: May 30, 1995

Related U.S. Application Data

[62] Division of Ser. No. 250,887, Sep. 29, 1988, which is a continuation of Ser. No. 146,307, Jan. 21, 1988, abandoned, which is a continuation of Ser. No. 919,395, Oct. 16, 1986, abandoned.

[51] Int. Cl.$^6$ .................. C10L 1/18; C10L 1/22
[52] U.S. Cl. .................. 44/331; 44/386
[58] Field of Search .................. 44/331, 386

[56] References Cited

U.S. PATENT DOCUMENTS

| | | | |
|---|---|---|---|
| 26,330 | 1/1859 | Colfer | 208/48 |
| 3,024,237 | 3/1962 | Drummond et al. | 260/326.3 |
| 3,087,936 | 4/1963 | Le Suer | 260/326.3 |
| 3,131,150 | 4/1964 | Stuart et al. | 252/34.7 |
| 3,154,560 | 10/1964 | Osuch | 260/326.3 |
| 3,172,892 | 3/1965 | Le Suer et al. | 260/326.5 |
| 3,198,736 | 8/1965 | Henderson | 252/46.7 |
| 3,215,632 | 11/1965 | Hughes et al. | 252/51.5 |
| 3,215,707 | 11/1965 | Rense | 260/326.3 |
| 3,219,666 | 11/1965 | Norman et al. | 260/268 |
| 3,231,587 | 1/1966 | Rense | 260/346.8 |
| 3,235,484 | 2/1966 | Colfer | 208/48 |
| 3,254,025 | 5/1966 | Le Suer | 252/32.7 |
| 3,269,946 | 8/1966 | Wiese | 252/32.5 |
| 3,272,743 | 9/1966 | Norman et al. | 252/32.5 |
| 3,272,746 | 9/1966 | LeSuer | 252/47.5 |
| 3,278,550 | 10/1966 | Norman et al. | 260/326.3 |
| 3,284,409 | 11/1966 | Dorer | 252/49.9 |
| 3,284,410 | 11/1966 | Meinhardt | 252/49.6 |
| 3,288,714 | 11/1966 | Osuch | 252/57 |
| 3,361,673 | 1/1968 | Stuart et al. | 252/51.5 |
| 3,381,022 | 4/1968 | LeSuer | 260/404.8 |
| 3,403,102 | 9/1968 | Le Suer | 252/49.8 |
| 3,562,159 | 2/1971 | Mastin | 252/32.7 |
| 3,576,743 | 4/1971 | Widmer et al. | 252/51.5 |
| 3,632,510 | 1/1972 | Le Suer | 252/35 |
| 3,632,511 | 1/1972 | Liao | 252/51.5 A |
| 3,714,042 | 1/1973 | Greenough | 252/33.2 |
| 3,804,763 | 4/1974 | Meinhardt | 252/51.5 A |
| 3,806,456 | 4/1974 | Vogel | 252/51.5 A |
| 3,836,470 | 9/1974 | Miller | 252/51.5 A |
| 3,836,471 | 9/1974 | Miller | 252/51.5 A |
| 3,838,050 | 9/1974 | Miller | 252/40.5 |
| 3,838,052 | 9/1974 | Miller | 252/56 R |
| 3,879,308 | 4/1975 | Miller | 252/56 R |
| 3,912,764 | 10/1975 | Palmer, Jr. | 260/346.8 |
| 3,923,668 | 12/1975 | Johnston | 252/16 |
| 3,927,041 | 12/1975 | Cengel et al. | 260/346.8 |
| 3,948,800 | 4/1976 | Meinhardt | 252/356 |
| 3,950,341 | 4/1976 | Okamoto et al. | 260/268 C |
| 3,957,854 | 5/1976 | Miller | 260/482 R |
| 3,991,056 | 11/1976 | Okamoto et al. | 260/268 C |
| 3,991,098 | 11/1976 | Okamoto | 260/482 R |
| 4,062,786 | 12/1977 | Brois et al. | 252/51.5 R |
| 4,088,588 | 5/1978 | Pecoraro | 252/51.5 A |
| 4,110,349 | 8/1978 | Cohen | 260/346.74 |
| 4,113,639 | 9/1978 | Lonstrup et al. | 252/51.5 A |
| 4,116,876 | 9/1978 | Brois et al. | 252/49.6 |
| 4,123,373 | 10/1978 | Brois et al. | 252/48.6 |
| 4,151,173 | 4/1979 | Vogel | 260/326.5 F |
| 4,195,976 | 4/1980 | Ryer et al. | 44/63 |
| 4,234,435 | 11/1980 | Meinhardt et al. | 252/51.5 A |
| 4,502,970 | 3/1985 | Sschetelich et al. | 2252/32.7 E |

(List continued on next page.)

FOREIGN PATENT DOCUMENTS

| | | |
|---|---|---|
| 895398 | 3/1972 | Canada . |
| 0 072 645 A3 | 2/1983 | European Pat. Off. . |
| 0 082 601 A2 | 6/1988 | European Pat. Off. . |
| 0 271 937 A2 | 6/1988 | European Pat. Off. . |
| 984409 | 9/1963 | United Kingdom . |
| 1 368 277 | 9/1974 | United Kingdom . |
| 1 398 008 | 6/1975 | United Kingdom . |
| 1 440 219 | 6/1976 | United Kingdom . |
| 1 466 173 | 3/1977 | United Kingdom . |
| 2 023 169 | 12/1979 | United Kingdom . |
| 2 061 958 | 5/1981 | United Kingdom . |
| 2 062 672 | 5/1981 | United Kingdom . |
| 2 069 505 | 8/1981 | United Kingdom . |
| 2 071 139 | 9/1981 | United Kingdom . |
| 2 081 274 | 2/1982 | United Kingdom . |
| 2 081 722 | 2/1982 | United Kingdom . |
| WO 85/03504 | 8/1985 | WIPO . |

OTHER PUBLICATIONS

European Patent Office, Decision Rejecting the Opposition by BP Chemicals to EP 264,247, Aug. 14, 1995.

European Patent Office, Opposition by BP Chemicals to EP 264,247, Dec. 6, 1991 to Jan. 26, 1995.

Brazilian Patent & Trademark Institute, Opposition by Petroleo Brasileiro to PI 8705522, Oct. 12, 1990 to Aug. 2, 1994 (translation enclosed).

E.S. Forbes, et al., "The Mechanism of Action of Polyisobutenyl Succinimide Lubricating Oil Additives", Tribology vol. 5, No. 2, 72–77 (Apr. 1972).

M. V. Bogdanov et al., "Oxidative Thermal Degradation of Alkenylsuccinic Anhydrides", Neftehimiya, 13:743–748 (1973). month unavailable.

Primary Examiner—Jacqueline V. Howard
Attorney, Agent, or Firm—J. B. Murray, Jr.; K. R. Walton

[57] ABSTRACT

Hydrocarbyl substituted $C_4$ to $C_{10}$ monounsaturated dicarboxylic acid, anhydrides or esters, e.g. polyisobutenyl succinic anhydride, preferably made by reacting polymer of $C_2$ to $C_{10}$ monoolefin, preferably polyisobutylene, having a molecular weight of about 700 to 1200, preferably with a $C_4$ to $C_{10}$ monounsaturated acid, anhydride or ester, preferably maleic anhydride, such that there are 1.2 to 2.0 dicarboxylic acid producing moieties per molecule of said olefin polymer used in the reaction mixture. The resulting materials may be further reacted with amines, alcohols, amino alcohols, boric acid, etc. to form dispersants.

20 Claims, No Drawings

U.S. PATENT DOCUMENTS

| | | | |
|---|---|---|---|
| 4,637,886 | 1/1987 | Brois et al. | 252/51.5 A |
| 4,686,054 | 8/1987 | Wisotsky et al. | 252/32.7 E |
| 4,695,390 | 9/1987 | Koch et al. | 252/47.5 |
| 4,767,551 | 8/1988 | Hunt et al. | 252/32.7 |
| 4,820,432 | 4/1989 | Lundberg et al. | 252/51.5 A |
| 4,839,070 | 6/1989 | Gutierrez et al. | 252/51.5 A |
| 4,839,071 | 6/1989 | Gutierrez et al. | 252/51.5 A |
| 4,839,073 | 6/1989 | Gutierrez et al. | 252/51.5 A |
| 4,842,755 | 6/1989 | Dunn | 252/32.7 |
| 4,857,217 | 8/1989 | Gutierrez et al. | 252/47 |
| 4,863,624 | 9/1989 | Emert et al. | 252/51.5 A |
| 4,873,004 | 10/1989 | Beverwijk et al. | 252/32.5 |
| 4,915,857 | 4/1990 | Emert et al. | 252/32.7 E |

HIGH FUNCTIONALITY LOW MOLECULAR WEIGHT OIL SOLUBLE DISPERSANT ADDITIVES USEFUL IN OLEAGINOUS COMPOSITIONS

This is a division of application Ser. No. 250,887, filed Sep. 29, 1988 which was a Rule 60 Continuation of U.S. Ser. No. 146,307, filed Jan. 21, 1988, now abandoned which was a Rule 60 Continuation of U.S. Ser. No. 919,395 filed Oct. 16, 1986 now abandoned.

BACKGROUND OF THE INVENTION

1. Field of the Invention

This invention relates to oil soluble dispersant additives useful in fuel and lubricating oil compositions, including concentrates containing said additives, and methods for their manufacture and use. The dispersant additives are dicarboxylic acids, anhydrides, esters, etc., substituted with a high molecular weight hydrocarbon group, and derivatives thereof such as salts, amides, imides, esters, oxazolines, etc. formed by further reaction with amine, alcohol, amino alcohols, and which may be further treated, e.g. borated. The high molecular weight hydrocarbon group has a number average molecular weight ($\overline{M}_n$) of about 700 to 1200. The additives will have a ratio (functionality) of about 1.2 to 2.0 dicarboxylic acid producing moieties per said high molecular weight hydrocarbon used in the reaction.

2. Prior Disclosures

U.S. Pat. No. 4,234,435 discloses as oil additives, polyalkene substituted dicarboxylic acids derived from polyalkenes having a $\overline{M}_n$ of 1300 to 5,000 and containing at least 1.3 dicarboxylic acid groups per polyalkene.

Canadian Patent 895,398 discloses reacting a mole of an unsaturated hydrocarbon group of 700 to 10,000 mol. wt. with 1 to 1.5 moles of chloro-substituted maleic or fumaric acid, which material can then be further reacted with alcohol.

U.S. Pat. No. 3,927,041 discloses a mole of polybutene of 300 to 3,000 mol. wt. containing 5 to 200 ppm 1,3 dibromo-5,5-dialkylhydantoin as a catalyst reacted with 0.8 to 5, generally 1.05 to 1.15 moles of dicarboxylic acid or anhydride, to form materials which can be used per se, or as esters, amides, imides, amidines, in petroleum products.

U.S. Pat. No. 3,215,707 discloses reacting chlorine with a mixture of polyolefin up to 50,000 molecular weight, especially of 250 to 3,000 molecular weight with one or more moles of maleic anhydride depending upon whether one or more succinic anhydride radicals are to be in each polymer molecule.

U.S. Pat. Nos. 4,113,639 and 4,116,876 disclose an example of alkenyl succinic anhydride having a molecular weight of the alkenyl group of 1300 and a Saponification Number of 103 (about 1.3 succinic anhydride units per hydrocarbon molecule). This alkenyl succinic anhydride may be reacted with polyamine and then boric acid (U.S. Pat. No. 4,113,639), or may be reacted with an amino alcohol to form an oxazoline (4,116,876) which is then borated by reaction with boric acid.

U.S. Pat. No. 4,062,786 in Example 13 shows a polyisobutenyl succinic anhydride of molecular weight of about 1300 and a Saponification Number of about 100 (about 1.25 succinic anhydride units per alkenyl group).

U.S. Pat. No. 4,123,373 in Example 3 shows a polyisobutenyl succinic anhydride of about 1400 molecular weight having a Saponification Number of 80, (about 1.07 succinic anhydride units per polyisobutylene unit).

Further related prior disclosures, which are expressly incorporated herein by reference in their entirety are U.S. Pat. Nos.: 3,087,936; 3,131,150; 3,154,560; 3,172,892; 3,198,736; 3,219,666; 3,231,587; 3,235,484; 3,269,946; 3,272,743; 3,272,746; 3,278,550; 3,284,409; 3,284,410; 3,288,714; 3,403,102; 3,562,159; 3,576,743; 3,632,510; 3,836,470; 3,836,471; 3,838,050; 3,838,052; 3,879,308; 3,912,764; 3,927,041; U.S. Pat. No. Re. 26,330; U.S. Pat. Nos. 4,110,349; 4,113,639; 4,151,173; 4,195,976; and U.K. Patents 1,368,277 and 1,398,008.

Copending Commonly Assigned application Ser. No. 754,001, filed Jul. 11, 1985, for J. Emert, R. D. Lundberg and M. Waddoups discloses alkenyl succinic anhydride made from 1500 to 5000 mol. wt. polyisobutylene with 1.05 to 1.25 succinic anhydride units per polyisobutene molecule.

SUMMARY OF THE INVENTION

The present invention is directed to a dispersant additive comprising a polyolefin of 700 to 1200 number average molecular weight substituted with 1.2 to 2.0, preferably 1.3 to 1.8, e.g. 1.4 to 1.7, dicarboxylic acid producing moieties, preferably acid or anhydride moieties, per polyolefin molecule. This acid or anhydride material is useful per se as an additive, e.g. a dispersant additive, for example in the same manner as previously known polyolefin substituted dicarboxylic acid or anhydride acylating agents. For example, U.S. Pat. No. 3,288,714 shows prior acylating agents used as dispersant/detergents and U.S. Pat. No. 3,714,042 shows prior acylating agents used to treat overbased metal complexing agents. The dicarboxylic acid producing materials of the invention can also be further reacted with a nucleophilic reactant such as amines, alcohols, including polyols, aminoalcohols, etc. to form other useful dispersant additives. If the acid producing material is to be further reacted, e.g. neutralized, then generally a major proportion, that is at least 50% of the acid units up to all the acid units will be reacted with the nucleophilic reactant.

The materials of the invention are a further improvement because of their effectiveness as dispersants coupled with enhanced low temperature properties, as compared to those prior disclosures mentioned above. These inventive materials are particularly useful with V.I. improvers in formulating multigrade oils.

Multigrade lubricating oils typically are identified by two numbers such as 10W30, 5W30 etc. The first number in the multigrade designation is associated with a maximum low temperature (e.g. -20° C.) viscosity requirement for that multigrade oil as measured typically by a cold cranking simulator (CCS) under high shear, while the second number in the multigrade designation is associated with a minimum high temperature (e.g. 100° C.) viscosity requirement. Thus, each particular multigrade oil must simultaneously meet both strict low and high temperature viscosity requirements in order to qualify for a given multigrade oil designation. Such requirements are set e.g., by ASTM specifications. By "low temperature" as used herein is meant temperatures of typically from about -30° to about -5° C. By "high temperature" as used herein is meant temperatures of typically at least about 100° C.

The minimum high temperature viscosity requirement, e.g. at 100° C., is intended to prevent the oil from thinning out too much during engine operation which can lead to excessive wear and increased oil consumption. The maximum low temperature viscosity requirement is intended to facilitate engine starting in cold weather and to ensure pumpability, i.e., the cold oil should readily flow or slump into the well for the oil pump, otherwise the engine can be damaged due to insufficient lubrication.

In formulating an oil which efficiently meets both low and high temperature viscosity requirements, the formulator may use a single oil of desired viscosity or a blend of two lubricating oils of different viscosities, in conjunction with manipulating the identity and amount of additives that must be present to achieve the overall target properties of a particular multigrade oil including its viscosity requirements.

The natural viscosity characteristic of a lubricating oil is typically expressed by the neutral number of the oil (e.g. S150N) with a higher neutral number being associated with a higher natural viscosity at a given temperature. In some instances the formulator will find it desirable to blend oils of two different neutral numbers, and hence viscosities, to achieve an oil having a viscosity intermediate between the viscosity of the components of the oil blend. Thus, the neutral number designation provides the formulator with a simple way to achieve a desired base oil of predictable viscosity. Unfortunately, merely blending oils of different viscosity characteristics does not enable the formulator to meet the low and high temperature viscosity requirements of multigrade oils. The formulator's primary tool for achieving this goal is an additive conventionally referred to as a viscosity index improver (i.e., V.I. improver).

The V.I. improver is conventionally an oil-soluble long chain polymer. The large size of these polymers enables them to significantly increase Kinematic viscosities of base oils even at low concentrations. However, because solutions of high polymers are non-Newtonian they tend to give lower viscosities than expected in a high shear environment due to the alignment of the polymer. Consequently, V.I. improvers impact (i.e., increase) the low temperature viscosities (i.e. CCS viscosity) of the base oil to a lesser extent than they do the high temperature viscosities. Accordingly, constraints are placed on the amount of V.I. improver which a formulator can employ for a given oil blend in order to meet the low and high temperature viscosity requirements of a target multigrade oil.

The aforesaid viscosity requirements for a multigrade oil can therefore be viewed as being increasingly antagonistic at increasingly higher levels of V.I. improver. For example, if a large quantity of V.I. improver is used in order to obtain high viscosity at high temperatures, the oil may now exceed the low temperature requirement. In another example, the formulator may be able to readily meet the requirement for a 10W30 oil but not a 5W30 oil, with a particular ad-pack (additive package) and base oil. Under these circumstances the formulator may attempt to lower the viscosity of the base oil, such as by increasing the proportion of low viscosity oil in a blend, to compensate for the low temperature viscosity increase induced by the V.I. improver, in order to meet the desired low and high temperature viscosity requirements. However, increasing the proportion of low viscosity oils in a blend can in turn lead to a new set of limitations on the formulator, as lower viscosity base oils are considerably less desirable in diesel engine use than the heavier, more viscous oils.

Further complicating the formulator's task is the effect that dispersant additives can have on the viscosity characteristics of multigrade oils. Dispersants are frequently present in quality oils such as multigrade oils, together with the V.I. improver. The primary function of a dispersant is to maintain oil insolubles, resulting from oxidation during use, in suspension in the oil thus preventing sludge flocculation and precipitation. Consequently, the amount of dispersant employed is dictated and controlled by the effectiveness of the material for achieving its dispersant function. A typical U.S. Service Station commercial oil contains four times as much dispersant as V.I. improver (as measured by the respective dispersant and V.I. improver active ingredients). In addition to dispersancy, conventional dispersants can also increase the low and high temperature viscosity characteristics of a base oil simply by virtue of its polymeric nature. In contrast to the V.I. improver, the dispersant molecule is much smaller. Consequently, the dispersant is much less shear sensitive, thereby contributing more to the low temperature CCS viscosity (relative to its contribution to the high temperature viscosity of the base oil) than a V.I. improver. Moreover, the smaller dispersant molecule contributes much less to the high temperature viscosity of the base oil than the V.I. improver. Thus, the magnitude of the low temperature viscosity increase induced by the dispersant can exceed the low temperature viscosity increase induced by the V.I. improver without the benefit of a proportionately greater increase in high temperature viscosity as obtained from a V.I. improver. Consequently, as the dispersant induced low temperature viscosity increase causes the low temperature viscosity of the oil to approach the maximum low temperature viscosity limit, the more difficult it is to introduce a sufficient amount of V.I. improver effective to meet the high temperature viscosity requirement and still meet the low temperature viscosity requirement. The formulator is thereby once again forced to shift to the undesirable expedient of using higher proportions of low viscosity oil to permit addition of the requisite amount of V.I. improver without exceeding the low temperature viscosity limit.

In accordance with the present invention, dispersants are provided which have been found to possess inherent characteristics such that they contribute considerably less to low temperature viscosity increases than dispersants of the prior art while achieving similar high temperature viscosity increases. Moreover, as the concentration of dispersant in the base oil is increased, this beneficial low temperature viscosity effect becomes increasingly more pronounced relative to conventional dispersants. This advantage is especially significant for high quality heavy duty diesel oils which typically require high concentrations of dispersant additive. Furthermore, these improved viscosity properties facilitate the use of V.I. improvers in forming multigrade oils spanning a wider viscosity requirement range, such as 5W30 oils, due to the overall effect of lower viscosity increase at low temperatures while maintaining the desired viscosity at high temperatures as compared to the other dispersants. More significantly, these viscometric properties also permit the use of higher viscosity base oils with attendant advantages in engine performances. The high level of functionality, combined with the low molecular weight of 700 to 1200 of the olefin polymer component, results in sa d improved viscometric properties relative to either higher molecular weight polymer or to products with a lower degree of functionality.

Even further improvements, i.e. reductions, in low temperature CCS viscosity are achieved by increasing the branching of the dispersant molecule in conjunction with control of the hydrocarbyl:polar group ratio. Increased branching is achieved by reacting the hydrocarbyl, substituted dicarboxylic acid or anhydride with a nucleophilic reactant having at least three acid reactive functional groups, e.g. amine, alcohol and mixtures thereof; and controlling the molar ratio of the acid or anhydride containing reactive moiety and nucleophilic reactant within defined limits as specified herein. In the present invention, as the degree of functionality of the nucleophilic reactant increases, this permits more than two hydrocarbyl substituted diacids or anhydride moieties to react therewith, thereby increasing the degree of branching of the resultant product and lowering the CCS viscosity thereof for a given high temperature viscosity. Furthermore, the lower molecular weight of the polymers results in easier handling of the concentrate relative to high molecular weight, high functionality systems which tend to be gel-like.

THE HYDROCARBYL DICARBOXYLIC ACID MATERIAL

The long chain hydrocarbyl substituted dicarboxylic acid producing material, e.g. acid, anhydride, or ester, used in the invention includes a long chain hydrocarbon, generally a polyolefin, substituted typically with an average of about 1.2 to 2.0 (e.g. 1.2 to 1.8), preferably about 1.3 to 1.8 (e.g. 1.3 to 1.6), and most preferably about 1.4 to 1.7 (e.g. 1.4 to 1.6) moles, per mole of polyolefin, of an alpha- or beta unsaturated $C_4$ to $C_{10}$ dicarboxylic acid, anhydride or ester thereof, such as fumaric acid, itaconic acid, maleic acid, maleic anhydride, chloromaleic acid, dimethyl fumarate, chloromaleic anhydride, and mixtures thereof.

Preferred olefin polymers for reaction with the unsaturated dicarboxylic acid anhydride or ester are polymers comprising a major molar amount of $C_2$ to $C_{10}$, e.g. $C_2$ to $C_5$, monoolefin. Such olefins include ethylene, propylene, butylene, isobutylene, pentene, octene-1, styrene, etc. The polymers can be homopolymers such as polyisobutylene, as well as copolymers of two or more of such olefins such as copolymers of: ethylene and propylene; butylene and isobutylene; propylene and isobutylene; etc. Other copolymers include those in which a minor molar amount of the copolymer monomers, e.g., 1 to 10 mole %, is a $C_4$ to $C_{18}$ non-conjugated diolefin, e.g., a copolymer of isobutylene and butadiene; or a copolymer of ethylene, propylene and 1,4-hexadiene.

In some cases, the olefin polymer may be completely saturated, for example an ethylene-propylene copolymer made by a Ziegler-Natta synthesis using hydrogen as a moderator to control molecular weight.

The olefin polymers will usually have number average molecular weights within the range of about 700 and about 1200, e.g. 700 to 1100, more usually between about 800 and about 1000. Particularly useful olefin polymers have number average molecular weights within the range of about 900 and about 1000 with approximately one terminal double bond per polymer chain. An especially useful starting material for a highly potent dispersant additive made in accordance with this invention is polyisobutylene.

Processes for reacting the olefin polymer with the $C_{4-10}$ unsaturated dicarboxylic acid, anhydride or ester are known in the art. For example, the olefin polymer and the dicarboxylic acid material may be simply heated together as disclosed in U.S. Pat. Nos. 3,361,673 and 3,401,118 to cause a thermal "ene" reaction to take place. Alternatively, the olefin polymer can be first halogenated, for example, chlorinated or brominated to about 1 to 8, preferably 3 to 7 wt. % chlorine, or bromine, based on the weight of polymer, by passing the chlorine or bromine through the polyolefin at a temperature of 60° to 160° C., e.g. 110° to 130° C. for about 0.5 to 10, preferably 1 to 7 hours. The halogenated polymer may then be reacted with sufficient unsaturated acid or anhydride at 100° to 250° C., usually about 180° to 235° C. for about 0.5 to 10 hours, e.g. 3 to 8 hours, so the product obtained will contain an average of about 1.2 to 2.0 moles, preferably 1.3 to 1.8 moles, e.g. 1.6 moles, of the unsaturated acid per mole of the halogenated polymer. Processes of this general type are taught in U.S. Pat. Nos. 3,087,436; 3,172,892; 3,272,746 and others.

Alternatively, the olefin polymer, and the unsaturated acid material are mixed and heated while adding chlorine to the hot material. Processes of this type are disclosed in U.S. Pat. Nos. 3,215,707; 3,231,587; 3,912,764; 4,110,349; 4,234,435; and in U.K. 1,440,219.

By the use of halogen, about 65 to 95 wt. % of the polyolefin, e.g. polyisobutylene will normally react with the dicarboxylic acid material. Upon carrying out a thermal reaction without the use of halogen or a catalyst, then usually only about 50 to 85 wt. % of the polyisobutylene will react. Chlorination helps increase the reactivity. For convenience, all of the aforesaid functionality ratios of dicarboxylic acid producing units to polyolefin, e.g. 1.2 to 2.0, etc. are based upon the total amount of polyolefin, that is, the total of both the reacted and unreacted polyolefin, present in the resulting product formed in the aforesaid reactions.

NITROGEN AND ALCOHOL ASHLESS DISPERSANT DERIVATIVES

Amine compounds useful as nucleophilic reactants for neutralization of the hydrocarbyl substituted dicarboxylic acid material include mono- and preferably polyamines, most preferably polyalkylene polyamines, of about 2 to 60 (e.g. 2 to 6), preferably 2 to 40, (e.g. 3 to 20) total carbon atoms and about 1 to 12 (e.g., 2 to 9), preferably 3 to 12, and most preferably 3 to 9 nitrogen atoms in the molecule. These amines may be hydrocarbyl amines or may be hydrocarbyl amines including other groups, e.g., hydroxy groups, alkoxy groups, amide groups, nitrites, imidazoline groups, and the like. Hydroxy amines with 1 to 6 hydroxy groups, preferably 1 to 3 hydroxy groups are particularly useful. Such amines should be capable of reacting with the acid or anhydride groups of the hydrocarbyl substituted dicarboxylic acid moiety either through the amine functionality or a substituent group reactive functionality. Since tertiary amines are generally unreactive with anhydrides, it is desirable to have at least one primary or secondary amine group on the amine. Preferred amines are aliphatic saturated amines, including those of the general formulas:

(Ia)

and

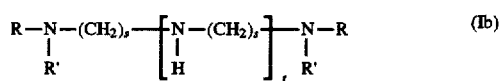

(Ib)

wherein R, R' and R" are independently selected from the group consisting of hydrogen; $C_1$ to $C_{25}$ straight or branched chain alkyl radicals; $C_1$ to $C_{12}$ alkoxy $C_2$ to $C_6$ alkylene radicals; $C_2$ to $C_{12}$ hydroxy amino alkylene radicals; and $C_1$ to $C_{12}$ alkylamino $C_2$ to $C_6$ alkylene radicals; each s can be the same or a different number of from 2 to 6, preferably 2 to 4; and t is a number of typically from 0 to 10, preferably about 2 to 7, most preferably about 3 to 7. To assure a facile reaction it is preferred that R, R', R", (s), and (t) be selected in a manner sufficient to provide the compounds of formulas Ia and Ib with typically at least one primary or secondary amine group, preferably at least two primary or secondary amine groups. This can be achieved by selecting at least one of said R, R', or R" groups to be hydrogen or by letting (t) in formula Ib be at least one. The most preferred amines of the above formulas are represented by formula Ib and contain at least two primary amine groups and at least one, preferably at least three secondary amine groups.

Non-limiting examples of suitable amine compounds include: 1,2-diaminoethane; 1,3-diaminopropane; 1,4-diaminobutane; 1,6-diaminohexane; polyethylene amines such as diethylene triamine; triethylene tetramine; tetraethylene pentamine; polypropylene amines such as 1,2-propylene diamine; di-(1,2-propylene)trimine; di-(1,3-propylene) triamine; N,N-dimethyl-1,3-diaminoropane; N,N-di-(2-aminoethyl) ethylene diamine; N,N-di(2-hydroxythyl)-1,3-propylene diamine; 3-dodecylpropylamine; N-dodecyl-1,3-propane diamine; tris hydroxymethylaminomethane (THAM); diisopropanol amine; diethanol amine; triethanol amine; mono-, di-, and tri-tallow amines; amino morpholines such as N-(3-aminoproyl)morpholine; and mixtures thereof.

Other useful amine compounds include: alicyclic diamines such as 1,4-di(aminomethyl) cyclohexane, and heterocyclic nitrogen compounds such as imidazolines, and N-aminoalkyl piperazines of the general formula:

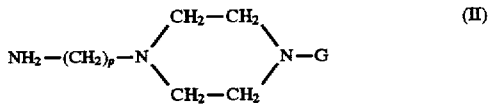 (II)

wherein G is independently selected from the group consisting of hydrogen and omega-non-tertiary aminoalkylene radicals of from 1 to 3 carbon atoms, and p is an integer of from 1 to 4. Non-limiting examples of such amines include 2-pentadecyl imidazoline; N-(2-aminoethyl) piperazine; and mixtures thereof.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamine) compounds averaging about 5 to 7 nitrogen atoms per molecule are available commercially under trade names such as "Polyamine H", "Polyamine 400", "Dow Polyamine E-100", etc.

Useful amines also include polyoxyalkylene polyamines such as those of the formulae:

 (III)

where "m" has a value of about 3 to 70 and preferably 10 to 35; and

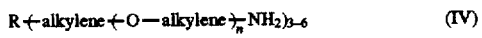 (IV)

where "n" has a value of about 1 to 40, with the provision that the sum of all the n's is from about 3 to about 70, and preferably from about 6 to about 35, and R is a substituted saturated hydrocarbon radical of up to 10 carbon atoms, wherein the number of substituents on the R group is represented by the value of "a", which is a number from 3 to 6. The alkylene groups in either formula (III) or (IV) may be straight or branched chains containing about 2 to 7, and preferably about 2 to 4 carbon atoms.

The polyoxyalkylene polyamines of formulas (III) or (IV) above, preferably polyoxyalkylene diamines and polyoxyalkylene triamines, may have number average molecular weights ranging from about 200 to about 4000 and preferably from about 400 to about 2000. The preferred polyoxyalkylene polyamines include the polyoxyethylene and polyoxypropylene diamines and the polyoxypropylene triamines having average molecular weights ranging from about 200 to 2000. The polyoxyalkylene polyamines are commercially available and may be obtained, for example, from the Jefferson Chemical Company, Inc. under the trade name "Jeffamines D-230, D-400, D-1000, D-2000, T-403", etc.

The amine s readily reacted with the dicarboxylic acid material, e.g. alkenyl succinic anhydride, by heating an oil solution containing 5 to 95 wt. % of dicarboxylic acid material to about 100° to 200° C., preferably 125° to 175° C., generally for 1 to 10, e.g. 2 to 6 hours until the desired amount of water is removed. The heating is preferably carried out to favor formation of imides or mixtures of imides and amides, rather than amides and salts. Reaction ratios of dicarboxylic acid material to equivalents of amine as well as the other nucleophilic reactants described herein can vary considerably, depending upon the reactants and type of bonds formed. Generally from 0.1 to 1.0, preferably about 0.2 to 0.6, e.g. 0.4 to 0.6, moles of dicarboxylic acid moiety content (e.g. grafted maleic anhydride content) is used, per equivalent of nucleophilic reactant, e.g. amine. For example, about 0.8 mole of a pentamine (having two primary amino groups and 5 equivalents of nitrogen per molecule) is preferably used to convert into a mixture of amides and imides, the product formed by reacting one mole of olefin with sufficient maleic anhydride to add 1.6 moles of succinic anhydride groups per mole of olefin, i.e. preferably the pentamine is used in an amount sufficient to provide about 0.4 mole (that is 1.6+(0.8×5) mole) of succinic anhydride moiety per nitrogen equivalent of the amine.

The nitrogen containing dispersant can be further treated by boration as generally taught in U.S. Pat. Nos. 3,087,936 and 3,254,025 (incorporated herein by reference thereto). This is readily accomplished by treating said acyl nitrogen dispersant with a boron compound selected from the class consisting of boron oxide, boron halides, boron acids and esters of boron acids in an amount to provide from about 0.02 atomic proportion of boron for each equivalent nitrogen of said acylated nitrogen composition to about 3 atomic proportions of boron for each atomic proportion of nitrogen of said acylated nitrogen composition. Usefully, the dispersants of the inventive combination contain from about 0.05 to 2.0 wt. %, e.g. 0.05 to 0.7 wt. %, boron based on the total weight of said borated acyl nitrogen compound. The boron, which appears to be in the product as dehydrated boric acid polymers (primarily (HBO$_2$)$_3$), is believed to attach to the dispersant amines as amine salts, e.g. the metaborate salt of said amines.

Treating Is readily carried out by adding from about 0.05 to 10 wt. %, e.g. 1 to 4 wt. %, (based on the weight of said acyl nitrogen compound) of said boron compound (preferably boric acid), which is most usually added as a slurry to said acyl nitrogen compound and heat ng with stirring at from about 135° to 190° C., e.g. 140°–170° C., for from 1 to 5 hours followed by nitrogen stripping at said temperature ranges. Alternatively, the boron treatment can be carried out by adding boric acid to the hot reaction mixture of the dicarboxylic acid material and amine while removing water.

Tris(hydroxymethyl) amino methane (THAM) can be reacted with the aforesaid acid material to form amides, imides or ester type additives as taught by U.K. 984,409, or to form oxazoline compounds and borated oxazoline compounds as described, for example, in U.S. Pat. No. 4,102,798; 4,116,876 and 4,113,639.

The ashless dispersants may also be esters derived from the aforesaid long chain hydrocarbon substituted dicarboxylic acid material and from hydroxy compounds such as monohydric and polyhydric alcohols or aromatic compounds such as phenols and naphthols, etc. The polyhydric alcohols are the most preferred hydroxy compound and preferably contain from 2 to about 10 hydroxy radicals, for example, ethylene glycol, diethylene glycol, triethylene glycol, tetraethylene glycol, dipropylene glycol, and other alkylene glycols in which the alkylene radical contains from 2 to about 8 carbon atoms. Other useful polyhydric alcohols include glycerol, mono-oleate of glycerol, monostearate of glycerol, monomethyl ether of glycerol, pentaerythritol, dipentaerythritol, and mixtures thereof.

The ester dispersant may also be derived from unsaturated alcohols such as allyl alcohol, cinnamyl alcohol, propargyl alcohol, 1-cyclohexane-3-ol, and oleyl alcohol. Still other classes of the alcohols capable of yielding the esters of this invention comprise the ether-alcohols and amino-alcohols including, for example, the oxy-alkylene, oxy-arylene-, amino-alkylene-, and amino-arylene-substituted alcohols having one or more oxy-alkylene, amino-alkylene or amino-arylene oxy-arylene radicals. They are exemplified by Cellosolve, Carbitol, N,N,N',N'-tetrahydroxy-trimethylene di-amine, and ether-alcohols having up to about 150 oxy-alkylene radicals in which the alkylene radical contains from 1 to about 8 carbon atoms.

The ester dispersant may be di-esters of succinic acids or acidic esters, i.e., partially esterified succinic acids; as well as partially esterified polyhydric alcohols or phenols, i.e., esters having free alcohols or phenolic hydroxyl radicals. Mixtures of the above illustrated esters likewise are contemplated within the scope of this invention.

The ester dispersant may be prepared by one of several known methods as illustrated for example in U.S. Pat. No. 3,522,179. The ester dispersant may also be borated, similar to the nitrogen containing dispersants, as described above.

Hydroxyamines which can be reacted with the aforesaid long chain hydrocarbon substituted dicarboxylic acid material to form dispersants include 2-amino-1-butanol, 2-amino-2-methyl-1-propanol, p-(beta-hydroxyethyl)-aniline, 2-amino-1-propanol, 3-amino-1-propanol, 2-amino-2-methyl-1,3-propane-diol, 2-amino-2-ethyl-1,3-propanediol, N-(beta-hydroxypropyl)-N'-(beta-amino-ethyl)-piperazine, tris(hydroxymethyl) amino-methane (also known as trismethylolaminomethane), 2-amino-1-butanol, ethanolamine, beta-(beta-hydroxyethoxy)-ethylamine, and the like. Mixtures of these or similar amines can also be employed. The above description of nucleophilic reactants suitable for reaction with the hydrocarbyl substituted dicarboxylic acid or anhydride includes amines, alcohols, and compounds of mixed amine and hydroxy containing reactive functional groups, i.e. amino-alcohols.

In a separate embodiment of the present invention, it has been found that further improved low temperature CCS viscosity properties can be imparted to the dispersant described hereinabove for a given high temperature viscosity by selecting the nucleophilic reactant to have a Degree of Reactive Functionality (DRF) of at least 3 and typically from about 3 to about 12, preferably from about 4 to about 11, and most preferably from about 5 to about 9. By Degree of Reactive Functionality is meant the number of functional groups selected from amine (e.g., primary or secondary) and hydroxy, on the nucleophilic reactant molecule, available for reaction with the dicarboxyl or anhydride groups of the hydrocarbyl substituted dicarboxylic acid.

Where the nucleophilic reactant is a mixture of different compounds, the DRF of the nucleophilic reactant is the average of the sum of the mathematical products of the mole % of each component compound in the mixture times the DRF of that component. It has been found that if one supplies more than about 2 moles of hydrocarbyl substituted dicarboxylic acid or anhydride per mole of said basic reactant having a DRF of at least 3, one will achieve a degree of branching needed to realize a further CCS viscosity improvement at constant high temperature viscosity (attributable to branching) in accordance with the present invention. Thus, where the DRF of the basic reactant is in excess of 3, it is not necessary that all of the reactive functional groups present on the nucleophilic reactant be reacted with a stoichiometric equivalent of hydrocarbyl substituted dicarboxylic acid or anhydride moiety to achieve an improvement in CCS viscosity. However, it is advantageous to maximize branching by utilizing the maximum stoichiometry (e.g. moles of diacid moiety) permitted by the DRF of the nucleophilic reactant which will retain its engine performance properties.

Accordingly, when employing a nucleophilic reactant having a DRF of 3 or greater as described above, the mole ratio of hydrocarbyl substituted acid or anhydride moiety to nucleophilic reactant equivalents is controlled n this embodiment to be typically at least 0.2, preferably at least 0.3, and most preferably at least 0.4, and can vary typically from about 0.2 to about 1.0, preferably from about 0.3 to about 0.75, and most preferably from about 0.35 to about 0.6.

A preferred group of dispersants are those derived from polyisobutylene substituted with succinic anhydride groups and reacted with polyethylene amines, e.g. tetraethylene pentamine, pentaethylene hexamine, polyoxyethylene and polyoxypropylene amines, e.g. polyoxypropylene diamine, trismethylolaminomethane and pentaerythritol, and combinations thereof. One particularly preferred dispersant combination involves a combination of (A) polyisobutene substituted with succinic anhydride groups and reacted with (B) a hydroxy compound, e.g. pentaerythritol, (C) a polyoxyalkylene polyamine, e.g. polyoxypropylene diamine, and (D) a polyalkylene polyamine, e.g. polyethylene diamine and tetraethylene pentamine using about 0.3 to about 2 moles each of (B) and (D) and about 0.3 to about 2 moles of (C) per mole of (A) as described in U.S. Pat. No. 3,804,763. Another preferred dispersant combination involves the combination of (A) polyisobutenyl succinic anhydride with (B) a polyalkylene polyamine, e.g. tetraethylene pentamine, and (C) a polyhydric alcohol or polyhydroxy-substituted aliphatic primary amine, e.g., pentaerythritol or trismethylolaminomethane as described in U.S. Pat. No. 3,632,511.

V.I. Improvers

As indicated earlier, a particular advantage of the inventive dispersant is use with V.I. improvers to form multi-grade automotive engine lubricating oils. These V.I. improvers are generally high molecular weight hydrocarbon polymers or polyesters. The V.I. improvers may also be derivatized to include other properties or functions, such as the addition of dispersancy properties. These oil soluble V.I. polymers will generally have number average molecular weights of from $10^3$ to $10^6$, preferably $10^4$ to $10^6$, e.g. 20,000 to 250,000, as determined by gel permeation chromatography or membrane osmometry.

Examples of suitable hydrocarbon polymers include homopolymers and copolymers of two or more monomers of $C_2$ to $C_{30}$, e.g. $C_2$ to $C_8$ olefins, including both alpha olefins and internal olefins, which may be straight or branched, aliphatic, aromatic, alkyl-aromatic, cycloaliphatic, etc. Frequently they will be of ethylene with $C_3$ to $C_{30}$ olefins, particularly preferred being the copolymers of ethylene and propylene. Other polymers can be used such as polyisobutylenes, homopolymers and copolymers of $C_6$ and higher alpha olefins, atactic polypropylene, hydrogenated polymers and copolymers and terpolymers of styrene, e.g. with isoprene and/or butadiene. The polymer may be degraded in molecular weight, for example by mastication, extrusion, oxidation or thermal degradation, and it may be oxidized and contain oxygen. Also included are derivatized polymers such as post-grafted interpolymers of ethylene-propylene with an active monomer such as maleic anhydride which may be further reacted with an alcohol, or amine, e.g. an alkylene polyamine or hydroxy amine, e.g. see U.S. Pat. Nos. 4,089,794; 4,160,739; 4,137,185; or copolymers of ethylene and propylene reacted or grafted with nitrogen compounds such as shown in U.S. Pat. Nos. 4,068,056; 4,068,058; 4,146,489 and 4,149,984.

The preferred hydrocarbon polymers are ethylene copolymers containing from 15 to 90 wt. % ethylene, preferably 30 to 80 wt. % of ethylene and 10 to 85 wt. %, preferably 20 to 70 wt. % of one or more $C_3$ to $C_{28}$, preferably $C_3$ to $C_{18}$, more preferably $C_3$ to $C_8$, alpha-olefins. While not essential, such co-polymers preferably have a degree of crystallinity of less than 25 wt. %, as determined by X-ray and differential scanning calorimetry. Copolymers of ethylene and propylene are most preferred. Other alpha-olefins suitable in place of propylene to form the copolymer, or to be used in combination with ethylene and propylene, to form a terpolymer, tetrapolymer, etc., include 1-butene, 1-pentene, 1-hexene, 1-heptene, 1-octene, 1-nonene, 1-decene, etc.; also branched chain alpha-olefins, such as 4-methyl-1-pentene, 4-methyl-1-hexene, 5-methylpentene-1, 4,4-dimethyl-1-pentene, and 6-methylheptene-1, etc., and mixtures thereof.

Terpolymers, tetrapolymers, etc., of ethylene, said $C_{3-28}$ alpha-olefin, and a non-conjugated diolefin or mixtures of such diolefins may also be used. The amount of the non-conjugated diolefin generally ranges from about 0.5 to 20 mole percent, preferably from about 1 to about 7 mole percent, based on the total amount of ethylene and alpha-olefin present.

The polyester V.I. improvers are generally polymers of esters of ethylenically,unsaturated $C_3$ to $C_8$ mono- and dicarboxylic acids such as methacrylic and acrylic acids, maleic acid, maleic anhydride, fumaric acid, etc.

Examples of unsaturated esters that may be used include those of aliphatic saturated mono alcohols of at least 1 carbon atom and preferably of from 12 to 20 carbon atoms, such as decyl acrylate, lauryl acrylate, stearyl acrylate, eicosanyl acrylate, docosanyl acrylate, decyl methacrylate, diamyl fumarate, lauryl methacrylate, cetyl methacrylate, stearyl methacrylate, and the like and mixtures thereof.

Other esters include the vinyl alcohol esters of $C_2$ to $C_{22}$ fatty or mono carboxylic acids, preferably saturated such as vinyl acetate, vinyl laurate, vinyl palmitate, vinyl stearate, vinyl oleate, and the like and mixtures thereof. Copolymers of vinyl alcohol esters with unsaturated acid esters such as the copolymer of vinyl acetate with dialkyl fumarates, can also be used.

The esters may be copolymerized with still other unsaturated monomers such as olefins, e.g. 0.2 to 5 moles of $C_2$–$C_{20}$ aliphatic or aromatic olefin per mole of unsaturated ester, or per mole of unsaturated acid or anhydride followed by esterification. For example, copolymers of styrene with maleic anhydride esterified with alcohols and amines are known, e.g. see U.S. Pat. No. 3,702,300.

Such ester polymers may be grafted with, or the ester copolymerized with, polymerizable unsaturated nitrogen-containing monomers to impart dispersancy to the V.I. improvers. Examples of suitable unsaturated nitrogen-containing monomers include those containing 4 to 20 carbon atoms such as amino substituted olefins as p-(beta-diethylaminoethyl) styrene; basic nitrogen-containing heterocycles carrying a polymerizable ethylenically unsaturated substituent, e.g. the vinyl pyridines and the vinyl alkyl pyridines such as 2-vinyl-5-ethyl pyridine, 2-methyl-5-vinyl pyridine, 2-vinyl-pyridine, 3-vinyl-pyridine, 4-vinyl-pyridine, 3-methyl-5-vinyl-pyridine, 4-methyl-2-vinyl-pyridine, 4-ethyl-2-vinyl-pyridine and 2-butyl-5-vinyl-pyridine and the like.

N-vinyl lactams are also suitable, e.g. N-vinyl pyrrolidones or N-vinyl piperidones.

The vinyl pyrrolidones are preferred and are exemplified by N-vinyl pyrrolidone, N-(1-methylvinyl) pyrrolidone, N-vinyl-5-methyl pyrrolidone, N-vinyl-3,3-dimethylpyrrolidone, N-vinyl-5-ethyl pyrrolidone, etc.

The Compositions

The dispersant additives of the present invention have been found to possess very good dispersant properties as measured herein in a wide variety of environments. Accordingly, the dispersants are used by Incorporation and dissolution into an oleaginous material such as fuels and lubricating oils. When the dispersants of this invention are used in normally liquid petroleum fuels such as middle distillates boiling from about 150° to 800° F., including kerosene, diesel fuels, home heating fuel oil, jet fuels, etc., a concentration of the additive in the fuel in the range of typically from about 0.001 to about 0.5, and preferably 0.001 to about 0.1 weight percent, based on the total weight of the composition, will usually be employed.

The dispersants find their primary utility in lubricating oil compositions which employ a base oil in which the additives are dissolved or dispersed. Such base oils may be natural or synthetic although the natural base oils will derive a greater benefit. Base oils suitable for use in preparing the lubricating oil compositions of the present invention include those conventionally employed as crankcase lubricating oils for spark-ignited and particularly compression-ignited internal combustion engines, such as automobile and truck engines, marine and railroad diesel engines, and the like. Advantageous results are also achieved by employing the dispersant additives of the present invention In base oils conventionally employed in and/or adapted for use as power transmitting fluids such as automatic transmission fluids, tractor fluids, universal tractor fluids and hydraulic fluids, heavy duty hydraulic fluids, power steering fluids and the like. Gear lubricants, industrial oils, pump oils and other lubricating oil compositions can also benefit from the incorporation therein of the additive compositions of the present invention.

Thus, the additives of the present invention may be suitably incorporated into synthetic base oils such as alkyl esters of dicarboxylic acids, polyglycols and alcohols; polyalphaolefins, alkyl benzenes, organic esters of phosphoric acids, polysilicone oil, etc.

Natural base oils include mineral lubricating oils which may vary widely as to their crude source, e.g. whether paraffinic, naphthenic, mixed, paraffinic-naphthenic, and the like; as well as to their formation, e.g. distillation range, straight run or cracked, hydrofined, solvent extracted and the like.

More specifically, the natural lubricating oil base stocks which can be used in the compositions of this invention may be straight mineral lubricating oil or distillates derived from paraffinic, naphthenic, asphaltic, or mixed base crudes, or, if desired, various blended oils may be employed as well as residuals, particularly those from which asphaltic constituents have been removed. The oils may be refined by conventional methods using acid, alkali, and/or clay or other agents such as aluminum chloride, or they may be extracted oils produced, for example, by solvent extraction with solvents of the type of phenol, sulfur dioxide, furfural, dichlorodiethyl ether, nitrobenzene, crotonaldehyde, etc.

The lubricating oil base stock conveniently has a viscosity of typically about 2.5 to about 12, and preferably about 2.5 to about 9 cst. at 100° C.

Thus, the dispersant products of this invention, that is the hydrocarbyl dicarboxylic acid producing material per se, or the product of said dicarboxylic acid producing material further reacted with amine, alcohol, amino alcohol, mixtures thereof, etc. can be employed in a lubricating oil composition which comprises lubricating oil, typically in a major amount, and the dispersant additive, typically in a minor amount, which is effective to impart enhanced dispersancy, relative to the absence of the additive. Additional conventional additives selected to meet the particular requirements of a selected type of lubricating oil composition can be included as desired.

The dispersants of this invention are oil-soluble, dissolvable in oil with the aid of a suitable solvent, or are stably dispersible materials. Oil-soluble, dissolvable, or stably dispersible as that terminology is used herein does not necessarily indicate that the materials are soluble, dissolvable, miscible, or capable of being suspended in oil in all proportions. It does mean, however, that the dispersant additives, for instance, are soluble or stably dispersible in oil to an extent sufficient to exert their intended effect in the environment in which the oil is employed. Moreover, the additional incorporation of other additives may also permit incorporation of higher levels of a particular dispersant, if desired.

Accordingly, while any effective amount of the dispersant additive can be incorporated into the lubricating oil composition, it is contemplated that such effective amount be sufficient to provide said lube oil composition with an amount of the additive of typically from about 0.01 to about 10 (e.g., 0.1 to 8), and preferably from about 0.2 to about 6 weight percent of active dispersant polymer based on the weight of said composition.

The dispersant additives of the present invention can be incorporated into the lubricating oil in any convenient way. Thus, they can be added directly to the oil by dispersing, or dissolving the same in the oil at the desired level of concentration. Such blending can occur at room temperature or elevated temperatures. Alternatively, the dispersant additive may be blended with a suitable oil-soluble solvent and base oil to form a concentrate, and then blending the concentrate with lubricating oil base stock to obtain the final formulation. Concentrates will typically contain from about 20 to about 80%, and preferably from about 25 to about 65%, by weight active dispersant additive, and typically from about 80 to about 20%, preferably from about 60 to about 20% by weight base oil, based on the concentrate weight.

The lubricating oil base stock for the dispersant additives of the present invention typically is adapted to perform a selected function by the incorporation of additives therein to form lubricating oil compositions (i.e. formulations).

Representative additives typically present in such formulations include viscosity modifiers, corrosion inhibitors, oxidation inhibitors, friction modifiers, other dispersants, anti-foaming agents, anti-wear agents, pour point depressants, detergents, rust inhibitors and the like.

Viscosity modifiers impart high and low temperature operability to the lubricating oil and permit it to remain relatively viscous at elevated temperatures and also exhibit acceptable viscosity or fluidity at low temperatures. Viscosity modifiers are generally high molecular weight hydrocarbon polymers including polyesters. The viscosity modifiers may also be derivatized to include other properties or functions, such as the addition of dispersancy properties. These oil soluble viscosity modifying polymers will generally have number average molecular weights of from $10^3$ to $10^6$, preferably $10^4$ to $10^6$, e.g. 20,000 to 250,000, as determined by gel permeation chromatography or osmometry.

Representative examples of suitable viscosity modifiers are any of the types known to the art including polyisobutylene, copolymers of ethylene and propylene, polymethacrylates, methacrylate copolymers, copolymers of an unsaturated dicarboxylic acid and vinyl compound, copolymers of styrene and isoprene (and hydrogenated derivatives thereof) interpolymers of styrene and acrylic esters, and mixtures of these.

Corrosion inhibitors, also known as anti-corrosive agents, reduce the degradation of the metallic parts contacted by the lubricating oil composition. Illustrative of corrosion inhibitors are phosphosulfurized hydrocarbons and the products obtained by reaction of a phosphosulfurized hydrocarbon with an alkaline earth metal oxide or hydroxide, preferably in the presence of an alkylated phenol or of an alkylphenol thioester, and also preferably in the presence of carbon dioxide. Phosphosulfurized hydrocarbons are prepared by reacting a suitable hydrocarbon such as a terpene, a heavy petroleum fraction of a $C_2$ to $C_6$ olefin polymer such as polyisobutylene, with from 5 to 30 weight percent of a sulfide of phosphorus for ½ to 15 hours, at a temperature in the range of 150° to 600° F. Neutralization of the phosphosulfurized hydrocarbon may be effected in the manner taught in U.S. Pat. No. 1,969,324.

Oxidation inhibitors reduce the tendency of mineral oils to deteriorate in service which deterioration can be evidenced by the products of oxidation such as sludge and varnish-like deposits on the metal surfaces and by viscosity growth. Such oxidation inhibitors include alkaline earth metal salts of alkylphenolthioesters having preferably $C_5$ to $C_{12}$ alkyl side chains, e.g. calcium nonylphenol sulfide, barium t-octylphenyl sulfide, dioctylphenylamine, phenylalphanaphthylamine, phosphosulfurized or sulfurized hydrocarbons, etc.

Friction modifiers serve to impart the proper friction characteristics to lubricating oil compositions such as automatic transmission fluids.

Representative examples of suitable friction modifiers are found in U.S. Pat. No. 3,933,659 which discloses fatty acid esters and amides; U.S. Pat. No. 4,176,074 which describes molybdenum complexes of polyisobutenyl succinic anhydride-amino alkanols; U.S. Pat. No. 4,105,571 which discloses glycerol esters of dimerized fatty acids; U.S. Pat. No. 3,779,928 which discloses alkane phosphonic acid salts;

U.S. Pat. No. 3,778,375 which discloses reaction products of a phosphonate with an oleamide; U.S. Pat. No. 3,852,205 which discloses S-carboxy-alkylene hydrocarbyl succinimide, S-carboxyalkylene hydrocarbyl succinamic acid and mixtures thereof; U.S. Pat. No. 3,879,306 which discloses N-(hydroxy-alkyl) alkenyl-succinamic acids or succinimides; U.S. Pat. No. 3,932,290 which discloses reaction products of di-(lower alkyl) phosphites and epoxides; and U.S. Pat. No. 4,028,258 which discloses the alkylene oxide adduct of phosphosulfurized N-(hydroxyalkyl) alkenyl succinimides. The disclosures of the above references are herein incorporated by reference. The most preferred friction modifiers are succinate esters, or metal salts thereof, of hydrocarbyl substituted succinic acids or anhydrides and thiobis alkanols such as described in U.S. Pat. No. 4,344,853.

Dispersants maintain oil insolubles, resulting from oxidation during use, in suspension in the fluid thus preventing sludge flocculation and precipitation. Suitable dispersants include high molecular weight alkyl succinates, the reaction product of oil-soluble polyisobutylene succinic anhydride with ethylene amines such as tetraethylene pentamine and borated salts thereof.

Pour point depressants lower the temperature at which the fluid will flow or can be poured. Such depressants are well known. Typical of those additives which usefully optimize the low temperature fluidity of the fluid are $C_8$–$C_{18}$ dialkylfumarate vinyl acetate copolymers, polymethacrylates, and wax naphthalene.

Foam control can be provided by an anti-foamant of the polysiloxane type, e.g. silicone oil and polydimethyl siloxane.

Anti-wear agents, as their name implies, reduce wear of metal parts. Representative of conventional anti-wear agents are zinc dialkyldithiophosphate, and zinc diaryldithiophosphate. Detergents and metal rust inhibitors include the metal salts of sulphonic acids, alkyl phenols, sulfurized alkyl phenols, alkyl salicylates, naphthenates and other oil soluble mono- and di-carboxylic acids. Highly basic (viz. overbased) metal salts, such as highly basic alkaline earth metal sulfonates (especially Ca and Mg salts) are frequently used as detergents. Representative examples of such materials, and their methods of preparation, are found in co-pending Ser. No. 754,001, filed Jul. 11, 1985, the disclosure of which is hereby incorporated by reference.

Some of these numerous additives can provide a multiplicity of effects, e.g. a dispersant-oxidation inhibitor. This approach is well known and need not be further elaborated herein.

Compositions when containing these conventional additives are typically blended into the base oil in amounts effective to provide their normal attendant function. Representative effective amounts of such additives (as the respective active ingredients) in the fully formulated oil are illustrated as follows:

| Compositions | Vol. % | Wt. % A.I. |
|---|---|---|
| Viscosity Modifier | .01–4 | 0.01–4 |
| Detergents | 0.01–2.5 | 0.01–3 |
| Corrosion Inhibitor | 0.01–1 | .01–1.5 |
| Oxidation Inhibitor | 0.01–1 | .01–1.5 |
| Dispersant | 0.01–7 | .01–8 |
| Pour Point Depressant | 0.01–1 | .01–1.5 |
| Anti-Foaming Agents | 0.001–0.1 | .001–0.15 |

-continued

| Compositions | Vol. % | Wt. % A.I. |
|---|---|---|
| Anti-Wear Agents | 0.001–1 | .001–1.5 |
| Friction Modifiers | 0.01–1 | .01–1.5 |
| Mineral Oil Base | Balance | Balance |

When other additives are employed, it may be desirable, although not necessary, to prepare additive concentrates comprising concentrated solutions or dispersions of the dispersant (in concentrate amounts hereinabove described), together with one or more of said other additives (said concentrate when constituting an additive mixture being referred to herein as an additive-package) whereby several additives can be added simultaneously to the base oil to form the lubricating oil composition. Dissolution of the additive concentrate into the lubricating oil may be facilitated by solvents and by mixing accompanied with mild heating, but this is not essential. The concentrate or additive-package will typically be formulated to contain the dispersant additive and optional additional additives in proper amounts to provide the desired concentration in the final formulation when the additive-package is combined with a predetermined amount of base lubricant. Thus, the dispersant of the present invention can be added to small amounts of base oil or other compatible solvents along with other desirable additives to form additive-packages containing active ingredients in collective amounts of typically from about 2.5 to about 90%, and preferably from about 15 to about 75%, and most preferably from about 25 to about 60% by weight additives in the appropriate proportions with the remainder being base oil.

The final formulations may employ typically about 10 wt. % of the additive-package with the remainder being base oil.

All of said weight percents expressed herein are based on active ingredient (A.I.) content of the additive, and/or upon the total weight of any additive-package, or formulation which will be the sum of the A.I. weight of each additive plus the weight of total oil or diluent.

This invention will be further understood by reference to the following examples, wherein all parts and percentages are by weight, unless otherwise noted and which include preferred embodiments of the invention.

EXAMPLE 1

Part A

A polyisobutenyl succinic anhydride (PIBSA) having a SA:PIB ratio of 1.53 succinic anhydride (SA) moieties per polyisobutylene (PIB) molecule of 950 $\overline{M}_n$ was prepared by heating a mixture of 2800 parts of polyisobutylene with 180 parts of maleic anhydride from 120° C. to a temperature of about 220° C. over 4 hours, which was then maintained at 220° C. for an additional 2 hours. 60 parts of additional maleic anhydride was added at the end of each hour during this 6-hour period (i.e. 360 additional parts of maleic anhydride). The reaction mixture was then heated for another hour at 220° C. During the entire 7-hour period, 430 parts of chlorine at a constant rate was added to the hot mixture. The reaction mixture was then stripped with nitrogen for about 1.25 hours. The resulting polyisobutenyl succinic anhydride had an ASTM Saponification Number of 156.8 which calculates to a succinic anhydride (SA) to polyisobutylene (PIB) ratio of 1.53 based upon starting PIB as follows:

$$SA\!:\!PIB \text{ ratio} = \frac{950 \times 156.8}{(112200) - (156.8 \times 96)} = 1.53$$

The PIBSA product was 94 wt. % active ingredient (a.i.), the remainder being primarily unreacted PIB. The SA:PIB ratio of 1.53 is based upon the total PIB charged to the reactor as starting material, i.e. both the PIB which reacts and the PIB which remains unreacted.

Part B—Amination

The PIBSA of Part A was aminated as follows:

1500 g of the PIBSA having a Sap. No. of 156.8 and 1410 g of S100N lubricating oil (solvent neutral oil having a viscosity of about 100 SUS at 37.8° C.) was mixed in a reaction flask and heated to about 150° C. Then 146.2 g of a commercial grade of polyethyleneamine (herein also referred to generically as a polyalkylene amine or PAM) which was a mixture of polyethyleneamines averaging about 5 to 7 nitrogens per molecule (i.e., a DRF of 5 to 7) was added over one hour, followed by nitrogen stripping for about 1.5 hours.

Part C—Boration

A portion of the dispersant of Part B was diluted 1:1 with S100N mineral lubricating oil and 1 g boric acid per 100 grams of diluted dispersant was added over about 2 hours while stirring and heating at 160° C., followed by 2 hours of nitrogen stripping, then cooling and filtering to give the final product. This final product had a viscosity of 30.8 cs. at 100° C., a nitrogen content of 0.84 wt. %, a boron content of 0.15 wt. % and contained 27 wt. % of the reaction product, i.e. the material actually reacted, and 73 wt. % of unreacted PIB and mineral oil (S100N).

EXAMPLE 2

1500 g of the PIBSA (Sap. No. 156.8) of Example 1, Part A, was mixed with about 1443 g S100N oil and 186.1 g PAM followed by heating and stripping as in Part B above. After 1:1 dilution with S100N 30.2 g boric acid was added followed by heating and nitrogen stripping as in Part C above.

The final product contained 1.02 wt. % N; 0.17 wt. % B, and contained 27 wt. % of the reaction product, and 73 wt. % of unreacted PIB and mineral oil (S100 N) with a viscosity of 26.5 cs. at 100° C.

EXAMPLE 3

A fully formulated 10W40 crankcase motor oil was prepared containing 10 wt. % of the diluted final product of Example 1, Part C, together with a base oil containing an overbased magnesium sulfonate, a zinc dialkyl dithiophosphate, 1.0 wt. % a.i. of an ethylene-propylene copolymer viscosity index improver containing about 44 wt. % ethylene and 56 wt. % propylene with a T.E. of 2.8 (referred to herein as V.I. improver Type A), and an anti-friction additive, in mineral lubricating oil. The mineral lubricating oil in the base oil was 64.3% S150N (solvent neutral oil having a viscosity of about 150 SUS at 37.8° C.) and 16% S100N (including the diluent added in Part C of Example 1).

Thickening efficiency (T.E.) is defined as the ratio of (1) the weight percent of a polyisobutylene (sold as an oil solution by Exxon Chemical Co. as Paratone N), having a Staudinger Molecular Weight of 20,000, required to thicken a solvent-extracted neutral mineral lubricating oil, having a viscosity of 150 SUS at 37.8° C., a viscosity index of 105 and an ASTM pour point of −17.8° C. (Solvent 150 Neutral) to a viscosity of 12.4 centistokes at 98.9° C., to (2) the weight percent of a test copolymer required to thicken the same oil to the same viscosity at the same temperature. T.E. is related to polymer molecular weight and is a convenient, useful measurement for formulation of lubricating oils of various grades. Polymers with T.E.'s of 1 to 2.8 or higher are frequently used as viscosity modifiers, e.g. V.I. improvers.

EXAMPLE 4

Example 3 was repeated except that 10 wt. % of the diluted final product of Example 2 was used in place of the final product of Example 1, Part C.

Comparative Example 1

Example 3 was repeated except that 5 wt. % of a known dispersant additive (Dispersant A) was used in place of the final product of Example 1, Part B. This Dispersant A consisted of about 50 wt. % mineral lubricating oil and about 50 wt. % of the reaction product of a polyisobutenyl succinic anhydride with PAM, which was then borated, wherein the polyisobutenyl group had a $M_n$ of about 950 and the functionality was about 1.0, i.e., about 1 succinic anhydride moiety per polyisobutylene molecule used in the reaction. The dispersant additive analyzed about 1.6 wt. % N, 0.3 wt. % boron, and had a viscosity of 220 cs. at 100° C. The amount of active ingredient in 5 wt. % of this additive was the same as 10 wt. % of the diluted additives of Examples 1 and 2.

The motor oil compositions of Examples 3 and 4, and Comparative Example 1 were tested at equivalent active ingredient for their viscosity characteristics at 100° C. in centistokes and for cold cranking properties in a Cold Cranking Simulator (CCS) according to ASTM-D-2607-72 method at −20° C. for viscosity in centipoises. The results are summarized at Table I as Runs 1 to 3.

When blended to an equivalent kinematic viscosity (KV) at 100° C., it is seen that the dispersants of the invention, as represented by Runs 1 and 2, give a significant improvement by thickening less at the low temperature viscosity, while thickening about the same at the high temperature, as compared to Dispersant A of Run 3.

EXAMPLES 5 AND 6, AND COMPARATIVE EXAMPLE 2

Examples 3, 4 and Comparative Example 1 were repeated but in place of the 1.0 wt. % active ingredient (a.i.) of the ethylene-propylene copolymer V.I. improver there was used 2.0 wt. % a.i. of a multi-functional ethylene-propylene V.I. improver. More specifically a copolymer of 44 wt. % ethylene and 56 wt. % propylene of 1.25 T.E. was grafted with maleic anhydride and mixed with polyisobutenyl succinic anhydride and reacted with polyamine as described in U.S. Pat. No. 4,502,972 (hereinafter V.I. improver Type B).

The viscosity characteristics of Examples 5, 6 and Comparative Example 2 are summarized at Table I, Runs 4 to 6 respectively.

Runs 4 to 6 show the dispersants of Examples 5 and 6 gave less thickening at −20°0 C. than the prior art Dispersant A of Comparative Example 2, even though all formulations achieved similar viscosities at 100° C.

TABLE I

| | | Dispersant Characteristics | | | | V. I. Improver | | Viscosity Characteristics | |
|---|---|---|---|---|---|---|---|---|---|
| Run No. | Correspond- ing Ex. or C. Ex. No. | Dispersant Type | PIB ($\overline{M}_n$) | SA:PIB (Mole Ratio) | Moles SA:Equivalent Amine | % a.i. of Dispersant In Base Oil | Type | % a.i. (In Base Oil) | KV @ 100° C. (cSt) | CCS @ −20° C. (cP) |
| 1 | EX's 1 + 3 | Borated PIBSA-PAM | 950 | 1.53 | 0.56 | 2.7 | A | 1.0 | 14.10 | 2923 |
| 2 | EX's 2 + 4 | " | 950 | 1.53 | 0.44 | 2.7 | A | 1.0 | 13.97 | 2992 |
| 3 | C. Ex. 1 | " | 950 | 1.0 | 0.44 | 2.5 | A | 1.0 | 14.07 | 3179 |
| 4 | Ex. 5 | " | 950 | 1.53 | 0.56 | 2.7 | B | 2.0 | 15.36 | 4030 |
| 5 | Ex. 6 | " | 950 | 1.53 | 0.44 | 2.7 | B | 2.0 | 15.14 | 4061 |
| 6 | C. Ex. 2 | " | 950 | 1.0 | 0.44 | 2.5 | B | 2.0 | 14.97 | 4230 |

PIB = polyisobutylene
SA = succinic anhydride on PIBSA
a.i. = active ingredient

EXAMPLE 7

Part A

A polyisobutenyl succinic anhydride (PIBSA) having a SA:PIB ratio of 1.40 succinic anhydride (SA) moieties per polyisobutylene (PIB) molecule of 950 $\overline{M}_n$ was prepared by heating a mixture of 2800 parts of polyisobutylene with 250 parts of maleic anhydride from 120° C. to a temperature of about 220° C. over 4 hours, and was then maintained at 220° C. for an additional 1 hour. 50 parts of additional maleic anhydride was added at the end of each hour during this 5-hour period for a total of 250 additional parts of maleic anhydride. The reaction mixture was heated for 1 additional hour at 220° C. During the entire 6-hour period, 390 parts of chlorine at a constant rate was added to the hot mixture. The reaction mixture was then stripped with nitrogen for about 1 hour. The resulting polyisobutenyl succinic anhydride had an ASTM Saponification Number of 145.3 which calculates to a succinic anhydride (SA) to polyisobutylene (PIB) ratio of 1.40 based upon starting PIB as follows:

$$SA{:}PIB \text{ ratio} = \frac{950 \times 145.3}{(112200) - (145.3 \times 96)} = 1.40$$

The PIBSA product was 93.1 wt. % active ingredient (a.i.), the remainder being primarily unreacted PIB. The SA:PIB ratio of 1.40 is based upon the total PIB charged to the reactor as starting material, i.e. both the PIB which reacts and the PIB which remains unreacted.

Part B—Amination

The PIBSA of Part A was aminated as follows:

600 g of the PIBSA having a Sap. No. of 145.3 and 699.9 g of S150N lubricating oil (solvent neutral oil having a viscosity of about 150 SUS at 37.8° C.) was mixed in a reaction flask and heated to about 150° C. Then 58.4 g of a commercial grade of polyethyleneamine (herein referred to as PAM) which was a mixture of polyethyleneamines averaging about 5 to 7 nitrogens per molecule was added over one hour, followed by nitrogen stripping for about 0.75 hours.

Part C—Boration

To a 600 g portion of the dispersant of Part 3 was added 18.5 g boric acid over about 2 hours while stirring and heating at 163° C., followed by 2 hours of nitrogen stripping, then cooling and filtering to give the final product. This final product had a viscosity of 498 cs. at 100° C., a nitrogen content of 1.48 wt. % a boron content of 0.51 wt. % and contained 48.3 wt. % of the reaction product, i.e. the material actually reacted, and 51.7 wt. % of unreacted PIB and mineral oil (S150N).

EXAMPLE 8

A fully formulated 15W40 crankcase motor oil. was prepared containing 7.40 wt. % of the final product of Example 7, Part C, together with an overbased magnesium sulfonate, a zinc dialkyl dithiophosphate, 0.89 wt. % a.i. of an ethylene-propylene V.I. improver having an ethylene content of 44 wt. %, a propylene content of 56 wt. %, and a T.E. of 1.8 (hereinafter V.I. improver Type C) and an anti-friction additive in mineral lubricating oil as a base stock. The mineral oil was a blend of 88.6 wt. % of a mineral oil having a 200 SUS viscosity at 37.80° C. with 11.4 wt. % of a high viscosity mineral oil having a 350 SUS viscosity at 37.80° C.

Comparative Example 3

Example 8 was repeated but using 6.67 wt. % of the prior art Dispersant A described above in Comparative Example 2. The amount of active ingredient in 6.67 wt. % Dispersant A was approximately the same as the amount of active ingredient in 7.4 wt. % of the dispersant from Example 7, Part C.

In order to meet the viscosity requirements, the base oil was changed to 100 wt. % of the low viscosity oil with none of the high viscosity oil. Also 1.00 wt. % a.i. of the V.I. improver was used with a corresponding lesser amount of the base stock.

The viscosity characteristics and the difference in formulation of Example 8 and Comparative Example 3 are summarized in Table II as Runs 7 and 8, respectively.

Comparative Example 4

Example 8 was repeated with the exception that the dispersant was replaced with the dispersant of Comparative Example 3 thereby providing a basis for comparison of viscosity properties under conditions similar to that employed in Example 8. The results are summarized at Table II, Run 9.

EXAMPLE 9

Example 8 was repeated with the exceptions that the dispersant was replaced with the unborated dispersant of Example 2 (step B) and the mineral oil used in preparing the fully formulated 15W40 crankcase motor oil comprised a blend of 79.1 wt. % of a low viscosity mineral oil having a 150 SUS viscosity at 37.8° C. with 20.9 wt. % of a high viscosity mineral oil having a 600 SUS viscosity at 37.8° C.

EXAMPLE 10

Example 9 was repeated except that the dispersant used was that of Example 1 (unborated) and the mineral oil blend comprised 76.8 wt. % of the 150 SUS mineral oil and 23.2 wt. % of the 600 SUS mineral oil.

Comparative Example 5

Example 8 was repeated except that the dispersant was replaced with an unborated prior art dispersant as described in Comparative Example 3 (except for the boron content therein described), and except that the mineral oil blend comprised 83.0 wt. % of the 150 SUS mineral oil and 17.0 wt. % of the 600 SUS mineral oil. The amount of the dispersant active ingredient (1.09 wt. %) in Comparative Example 5 was increased over the active ingredient amount (0.88 wt. % and 0.92 wt. %), used in Example 9 and 10, respectively, to provide a basis for comparison of the base oil solvent required to achieve substantially the same viscometric properties.

The viscosity characteristics and the differences in formulations of Example 9, Example 10 and Comparative Example 5 are summarized in Table II, runs 10, 11 and 12.

amine) yields a greater benefit in terms of the amount of high viscosity base stock that could be inserted into the blend.

EXAMPLE 11

PIBSA-PAM dispersants were prepared generally in accordance with Example 1 with the exception that the PIB molecular weights and SA:PIB ratios thereof were varied as described in Table III and with the exception that the boration step C of Example 1 was not used in Run 14. These dispersants were dissolved at 4 wt. % a.i. in S150N oil and the CCS viscosity determined. The results are summarized in Table III, Runs 13 to 14.

Comparative Example 6

Example 11 was repeated using PIBSA-PAM dispersants prepared generally in accordance with Example 1 with the exception that the PIB $\overline{M}_n$ and/or SA:PIB

TABLE II

| Run No. | 15W40 Motor Oil | Low/High[(1)] Visc. Oil (Wt. %) | V.I. (% a.i.) | SA:PIB Mole Ratio | Moles SA:Equivalent Amine | PIB $M_n$ | Vis. 100° C. (cSt) | CCS/−15° C. (cP) |
|---|---|---|---|---|---|---|---|---|
| 7 | Ex. 8 | 88.6/11.4 | 0.89 | 1.40 | — | 950 | 14.03 | 3465 |
| 8 | C. Ex. 3 | 100/0 | 1.00 | 1.0 | — | 950 | 13.97 | 3476 |
| 9 | C. Ex. 4 | 88.6/11.4 | 0.93 | 1.0 | — | 950 | 13.82 | 3774 |
| 10 | Ex. 9 | 79.1/20.9 | 0.92 | 1.52 | 0.44 | 950 | 14.20 | 3311 |
| 11 | Ex. 10 | 76.8/23.2 | 0.88 | 1.56 | 0.56 | 950 | 14.17 | 3310 |
| 12 | C. Ex. 5 | 83.0/17.0 | 1.09 | 1.05 | 0.44 | 950 | 14.15 | 3305 |

[(1)]Runs 7–9: Low viscosity oil = S200N, high viscosity oil = S350N;
Runs 10–11: Low viscosity = S150N, high viscosity oil = S600N, wherein the neutral number describes the viscosity of the solvent in SUS at 37.8° C.

As seen above, the use of the dispersant of Example 8 permitted a substantial amount of higher viscosity oil to be added to the base stock blend (relative to Comparative Example 3) while still meeting the low temperature viscosity requirements for a 15W40 motor oil (<3500 cP at −15° C.).

TABLE III

| Run No. | Corresponding Ex. or C. Ex. No. | PIB $M_n$ | SA:PIB Mole Ratio | Dispersant % a.i. | Amine* DRF | Moles SA:Equivalent Amine | CCS Viscosity @ −20° C. |
|---|---|---|---|---|---|---|---|
| 13 | Ex. 11 | 950 | 1.40 | 4 (1) | 5–7 | 0.52 | 3177 |
| 14 | Ex. 11 | 1200 | 1.58 | 4 (2) | 5–7 | 0.42 | 3258 |
| 15 | C. Ex. 6 | 950 | 1.05 | 4 (1) | 5–7 | 0.44 | 3411 |
| 16 | C. Ex. 6 | 2250 | 1.58 | 4 (2) | 5–7 | 0.42 | 3795 |

*Amine = polyethyleneamine
(1)—borated
(2)—unborated

This modification will result in improved diesel performance, because low viscosity oils tend to be detrimental to engine performance, especially in the CAT 1H2 and 1G2 tests. Compare further the viscometric properties of the formulations of Runs 7 and 9. Run 9, at the equivalent ratio of low and high viscosity base stocks to the ratio employed in Run 7, failed to meet the low temperature viscosity requirement for a 15W40 motor oil.

Also, as seen from a comparison of Run 10, 11 and 12, the dispersant of Example 10 which has a more branched structure than the dispersant of Example 9 (due to the former's higher amount of moles of SA per equivalent of ratios thereof were such that the dispersants were outside the scope of the present invention and were varied as described at Table III, and with the exception that the boration step C of Example 1 was not used in Run 16. The results are shown in Table III, Runs 12 to 15.

Engine Tests

Caterpillar 1G-2 Tests were carried out (except the tests were for 120 hours rather than the full 480 hour test described in ASTM Document for Single Cylinder Engine Test for Evaluating the Performance of Crankcase Lubricants, Caterpillar 1-G2 Test Method, Part 1, STP 509A), on the 15W40 crankcase motor oil prepared as in Example 9 (Lubricant A) and on the 15W40 crankcase motor oil prepared in Comparative Example 5 (Lubricant B). Lubricant A showed a TGF (top groove fill) of 66, and a WTD (weighted total demerits) of 257. Lubricant B showed a TGF of 54 and a WTD of 367. Therefore, while Lubricants A and B after 120 hours were both below the 80 TGF upper limit of the Caterpillar 1G2 test (as determined at 480 hours), only Lubricant A after 120 hours remained below the 300 WTD upper limit of the Caterpillar 1G2 test (as determined at 480 hours). Lubricant A is, therefore, significantly superior to Lubricant B in engine performance properties as reflected by the decreased engine deposits so observed.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A fuel composition comprising (i) a fuel and (ii) an oil soluble dispersant comprising an oil soluble reaction product of a reaction mixture comprising:

(a) a hydrocarbyl substituted $C_4$ to $C_{10}$ dicarboxylic acid producing material formed by reacting olefin polymer of $C_2$ to $C_{10}$ monoolefin having a number average molecular weight of about 700 to 1200 and a $C_4$ to $C_{10}$ monounsaturated acid material, said acid producing material having an average of about 1.3 to 1.8 dicarboxylic acid producing moieties per molecule of said olefin polymer present in the reaction used to form said acid producing material; and (b) a nucleophilic reactant selected from the group consisting of amine, alcohol, amino alcohol and mixtures thereof.

2. The composition according to claim 1, wherein the nucleophilic reactant of (b) is an amine.

3. The composition according to claim 2, wherein said dispersant is borated, the nucleophilic reactant is a polyethylenepolyamine, and said reaction mixture includes boric acid.

4. The composition according to claim 1, wherein the nucleophilic reactant of (b) is an alcohol.

5. The composition according to claim 1, wherein the nucleophilic reactant of (b) is an amino alcohol.

6. The composition according to claim 1, wherein the degree of reactive functionality of the nucleophilic reactant is at least 3 and at least 2 moles of dicarboxylic acid producing material per mole of said nucleophilic reactant are present in said reaction mixture.

7. The composition according to claim 1 wherein in said acid producing material of (a) there are about 1.4 to about 1.6 dicarboxylic acid producing moieties per molecule of said olefin polymer.

8. The composition according to claim 6 wherein the degree of reactive functionality of the nucleophilic reactant (b) is from about 3 to about 12 and there are from about 0.1 to about 1.0 mole of said diacid producing material of (a) per equivalent of said nucleophilic reactant of (b) present in the reaction mixture.

9. The composition according to claim 1, wherein the dispersant has a concentration in the range of 0.001 to 0.5 weight percent, based on the weight of the composition.

10. The composition according to claim 2, wherein the monounsaturated acid material is maleic anhydride.

11. The composition according to claim 10, wherein the olefin polymer comprises a member selected from the group consisting of polyisobutylene and copolymer of butylene and isobutylene.

12. The composition according to claim 11, wherein the nucleophilic reactant comprises amine containing 2 to 60 carbon atoms and 1 to 12 nitrogen atoms per molecule.

13. The composition according to claim 12, wherein the dispersant is further treated with a boron compound selected from the group consisting of boron oxide, boron halides, boron acids and esters of boron acids to obtain a borated dispersant.

14. The composition according to claim 13, wherein the nucleophilic reactant comprises amine containing 2 to 60 carbon atoms and 1 to 12 nitrogen atoms per molecule.

15. The composition according to claim 14, wherein the nucleophilic reactant (b) comprises a polyalkylene polyamine wherein said alkylene group contains 2 to 6 carbons and said polyalkylene polyamine contains about 2 to 9 nitrogens per molecule.

16. The composition according to claim 2, wherein the dicarboxylic acid producing moieties of said acid producing material comprise succinic moieties selected from the group consisting of acid, anhydride and ester groups.

17. The composition according to claim 16, wherein the nucleophilic reactant (b) comprises amine containing 2 to 60 carbon atoms and 1 to 12 nitrogen atoms per molecule.

18. The composition according to claim 17, wherein the nucleophilic reactant (b) comprises a polyalkylene polyamine wherein said alkylene group contains 2 to 6 carbons and said polyalkylene polyamine contains about 2 to 9 nitrogens per molecule.

19. The composition according to claim 16, wherein the olefin polymer comprises a member selected from the group consisting of polyisobutylene and copolymer of butylene and isobutylene.

20. The composition according to claim 19, wherein the nucleophilic reactant (b) comprises polyalkylene polyamine of about 2 to 60 carbon atoms and about 2 to 9 nitrogen atoms per molecule.

* * * * *